3,546,338
HEPARIN COMPOSITION

Robert Henry Engel, Suffern, and Marvin Jay Fahrenbach, Tomkins Cove, N.Y., and Richard Lansing Webb, Darien, Conn., assignors to American Cyanamid Company, Stamford, Conn., a corporation of Maine
No Drawing. Filed Mar. 30, 1967, Ser. No. 626,962
Int. Cl. A61k *17/18*
U.S. Cl. 424—183      10 Claims

ABSTRACT OF THE DISCLOSURE

The novel compositions of matter herein disclosed comprise a combination of heparin, a metabolizable vegetable oil, water and a solid dispersing agent. Furthermore, compositions in which the above metabolizable vegetable oil and water are in particular phase relationships are also disclosed, as well as a method of effecting the absorption of heparin in the alimentary canal of mammals.

Generally stated, the subject matter of the present invention relates to a novel composition of matter comprising heparin. More particularly, the invention relates to a composition of matter which comprises the combination of heparin, a metabolizable oil, water and a dispersing agent. Furthermore, the invention relates to a method of effecting the absorption of heparin by the alimentary canal of a mammal, which comprises introducing into the alimentary canal the composition herein-above defined.

BACKGROUND OF THE INVENTION

Heparin is a polysaccharide which occurs naturally in the body of a mammal, and functions to maintain the fluidity of blood. It is usually obtained from the livers or lungs of domestic animals used for food, and is available in its final, therapeutic form as a solution of the sodium salt. Heparin is employed to retard the coagulation of blood, and while useful therapeutically its utilization is materially affected by the fact that heparin must be administered parenterally since it is ineffective when introduced into the alimentary canal.

The present invention represents the culmination of a long series of investigations conducted largely by the inventors and their associates in the inherent problem of absorption of heparin by the alimentary canal of mammals. The inventive concept resides in the discovery that a composition of matter comprising the combination of heparin, a metabolizable oil, water and a dispersing agent is capable of absorption by the alimentary canal of mammals.

SUMMARY OF THE INVENTION

Therefore, the invention relates to a composition of matter which comprises the combination of heparin, about 5 to 30% of a metabolizable oil, about 60 to 95% of water and from about 0.01 to 5% of a dispersing agent. Furthermore, the invention relates to a method of effecting the absorption of heparin by the alimentary canal of mammals which comprises introducing the above composition into said alimentary canal.

The advantages which inure to the art as a consequence to the advent of the present invention should be readily apparent. Namely, the restrictions occasioned by the ineffectiveness of heparin when introduced into the alimentary canal of mammals have, for the most part, been obviated, since the novel compositions of the present invention provide for the absorption of heparin from the alimentary canal.

The novel compositions of matter of the present invention are divided into three categories, subgeneric to a composition which comprises a simple admixture of the combination of heparin, a metabolizable oil, water and a dispersing agent. The division of the compositions is predicated on the phase relationships of the metabolizable oil and water when same are present in the composition as distinct disperse and continuous phases. In a simple admixture the aqueous phase is usually a solution of heparin, and the proportion of oil and water in the composition may vary from about 1 part of oil to about 1 to 6 parts of water.

The first category is defined to include those compositions in which heparin is admixed in a vehicle comprising an oil-in-water dispersion and a dispersing agent. Heparin is again present in the aqueous phase, and the proportion of oil and water may vary from about 1 part of oil to about 2 to 10 parts of water. Ordinarily, the heparin is first dissolved in water and dispersion is effected by any of the conventional means subsequent to the addition of the dispersing agent. It is preferred to employ sonic means to effect dispersion, since such means usually result in dispersions having a particle size in the magnitude of 0.01 to 10 microns.

The second category is defined to include those compositions in which heparin is admixed in a vehicle comprising a water-in-oil dispersion and a dispersing agent. Heparin is again present in the aqueous phase, and the proportion of oil and water may vary from about 1 part of water to about 1 to 5 parts of oil. The compositions can be prepared in substantially the same manner employed for those compositions of the first category.

The third category is defined to include those compositions in which heparin is admixed in a vehicle comprising a bimultiple dispersion, that is a water-in-oil-in-water dispersion. Compositions of this type are usually prepared by a two-step procedure, in which the first step comprises dispersing the water, which contains the heparin, in the metabolizable oil with a suitable quantity of dispersing agent. The proportion of oil and water may be from about 1 part of oil to 1 part of water. The resulting water-in-oil dispersion is then subjected to the second step of the procedure, which entails dispersing said water-in-oil dispersion with an additional quantity of water and dispersing agent. The proportion of dispersion and water may vary from about 1 part of water-in-oil dispersion to about 1 to 20 parts of water.

The particular phase relationships achieved are dependent on a variety of factors, most notably, the ratio of the water and oil components, the particular dispersing agent employed and the mode of addition. No one factor can be considered as being solely determinative of the particular phase relationship achieved, since phase relationships are dependent on a combination of said factors.

For example, when the ratio of one component, that is either water or oil, is greater than the other component, the component of greater concentration will usually constitute the continuous phase. However, in the presence of particular dispersing agents a phase relationship may be achieved in which the disperse phase constitutes a concentration greater than 50% by volume.

The effect of a particular solid dispersing agent on phase relationship relates to both a quantitative and qualitative evaluation of the dispersing agent, that is the number and type of hydrophilic or hydrophobic groups present on a particular dispersing agent. This evaluation is referred to as the Atlas HLB number, and generally, dispersing agents having a low Atlas HLB number favor the formation of water-in-oil dispersions, whereas dispersing agents having a high Atlas HLB number favor the formation of oil-in-water dispersions. The Atlas HLB numbers of various solid dispersing agents are set forth in the text Emulsions, Becher, P., 2nd Edition, Reinhold Publishing, pages 235 to 238 inclusive, these pages are incorporated by reference as part of the instant specification. The solid dipsersing agents which can be employed in the novel compositions of the present invention may be either anionic, cationic or non-ionic in nature. However, for the purposes of the present invention it is preferred to employ an anionic solid dispersing agent, in particular sodium lauryl sulfate.

Among the anionic dispersing agents which can be employed in the novel compositions of the present invention are sodium lauryl sulfate, sodium taurocholate, sodium glycocholate, sodium cholate, the orthophosphate esters of polyoxyethylated fatty alcohols sold as GAFAC dispersing agents by General Aniline and Film, and dioctyl sodium sulfosuccinate among others. Whereas, among the cationic dispersing agents which can be employed in the novel compositions of the present invenion are hexadecylamine, cetyl trimethyl ammonium chloride and the like. Lastly, among those non-ionic dispersing agents which can be employed in the novel compositions of the present invention are polyosyethylene sorbitan monolaurate, mannide monooleate and the like. A comprehensive discussion of solid dispersing agents appears in the text Emulsions, Becher, P., 2nd Edition, Reinhold Publishing, pages 210 to 231 inclusive, these pages are incorporated by reference as part of the instant specification. It should be readily apparent that the primary criteria to be met by a dispersing agent employed in the novel compositions of the present invention is physiological acceptance. Furthermore, it has been found that in addition to the foregoing dispersing agents a small amount, from 0.5 to 2% of egg yolk, or from 1 to 3% monoolein, enhances the dispersion. The monoolein in addition to effecting dispersion also enhances the activity of the composition. With regard to the factors effecting phase relationship, the sequence of addition of the oil and water components also effects phase relationship, that is the last component to be added tends to constitute the disperse phase.

The term metabolizable oil as employed in the instant specification and claims shall be defined as an oil which is capable of assimilation by the mucous membrane of the alimentary canal of a mammal, and includes vegetable oils such as corn oil, peanut oil, olive oil, coconut oil and the like, as well as pure triglycerides such as trioctanoin, trilaurin and triolein among others.

A preferred composition representative of the invention would, therefore, contain from 0.5 to 30% heparin, having an activity of not less than 120 U.S.P. units per milligram, present in a vehicle which is an oil-in-water dispersion comprising 12% trioctanoin, 0.1% sodium lauryl sulfate and the remainder water.

With regard to the method of effecting the absorption of heparin by the alimentary canal of mammals, any mode of administration which comprises introducing the novel compositions of the present invention into the alimentary canal of a mammal such as intraduodenally and the like shall be considered as being within the scope of the present invention. Furthermore, it is preferred to employ a composition in which the heparin is present in an oil-in-water dispersion.

In addition to the compositions hereinabove set forth, a composition comprising the combination of heparin, a metabolizable oil and a dispersing agent shall be considered as being within the scope of the present invention, since the aqueous nature of the alimentary canal of mammals can readily provide the aqueous component of the compositions of the present invention. It is also reasonable to assume that other therapeutic agents may be rendered effective when introduced into the alimentary canal of mammals by substituting same for heparin in the novel compositions of the present invention.

Lastly, the novel compositions of the present invention may optionally include such materials as preservatives, excipients, buffers, fillers, sweeteners, extenders and the like.

The following example are provided for illustrative purposes and may include particular features of the invention; however, the examples should not be construed as limiting the invention, many variations of which are possible without departing from the spirit or scope thereof.

EXAMPLE 1

Utilization of a novel composition of the present invention

This example demonstrates the utilization of a novel composition of the present invention to effect the absorption of heparin. Furthermore, this example demonstrates the significant results obtained by employing a novel composition of the present invention to effect the absorption of heparin in the alimentary canal of a mammal.

The compositions which are hereinafter set forth, and are employed in the instant example, are prepared in the following manner:

*Composition A.*—Approximately 3 ml. of a 24% solution of heparin in water, pH 6.5, and 28.5 ml. of a 1% aqueous sodium lauryl sulfate solution are dispersed with 4.5 ml. of trioctanoin, producing an oil-in-water dispersion. The heparin content of this composition is 20 mg./ml.

*Composition B.*—Approximately 200 mg. of heparin are dissolved in 10 ml. of water, pH 6.5, to produce an aqueous solution of heparin. The heparin content of this composition is 20 mg./ml.

*Composition C.*—A dispersion is prepared in the manner set forth for Composition A, with the exception that water is substituted in place of heparin.

Three groups of gerbils, two groups of six and one group of three are administered the foregoing compositions. The first two groups of six are administered Compositions A and B respectively, intraduodenally in a dose equivalent to 100 mg. of heparin per kilogram of body weight. The third group of three gerbils is maintained as a control, and is administered proportionate dosages of Composition C intraduodenally.

Blood samples are withdrawn by heart puncture in an oxalated syringe, that is both of the treated groups, as well as the control group 30 minutes subsequent to administration. The effect of heparin in the gerbils may be measured by performing a clearing factor assay on the blood samples as hereinafter described, and the results obtained with Compositions A, B, and C are summarized in the following table. The results clearly demonstrate that absorption of heparin by the alimentary canal was effected. Furthermore, the results demonstrate a substantial increase in clearing factor activity as evidenced by a decrease in optical density of the assay system, 68% after 15 minutes and 73% after 30 minutes, which are significant when contrasted to the results achieved by Compositions B and C.

TABLE 1

| | Optical density [1] at 650 mμ±S.E.[2] | | |
|---|---|---|---|
| | Initial | 15 minutes | 30 minutes |
| Tested compositions: | | | |
| A | 0.82±0.01 | 0.26±0.02 | 0.22±0.02 |
| B | 0.84±0.01 | 0.81±0.01 | 0.80±0.01 |
| C | 0.82±0.00 | 0.79±0.01 | 0.80±0.01 |

[1] The results are expressed as the averages of the groups.
[2] Standard errors are calculated from the range of the individual values.

The optical density assay of post heparin clearing factor is carried out in the following manner: The blood samples obtained by heart puncture are placed in ice cold 12 ml. centrifuge tubes containing 5 mg. of dry sodium oxalate. The tubes are centrifuged and the supernatant plasma is withdrawn as needed. The assay is carried out in a 1 ml. Colman spectrophotometer cuvette. Exactly 0.6 ml. of 0.05 M tris(hydroxymethyl) aminomethane buffer solution, pH 8.5, 0.3 ml. of 25% plasma albumin, pH 8.6 and 0.5 ml. of post heparin plasma are added to the cuvette and mixed thoroughly. The optical density is then recorded in a suitable spectrophotometer at 650 mμ. This value represents the enzyme blank and is the limiting value to which the optical density can fall after addition of the substrate. The mixture is then preincubated for 2 minutes at 37° C. and 0.1 ml. of 6% Ediol, a lipid emulsion consisting of 50% coconut oil and 12.5% sucrose, marketed by Riker Laboratories, is added and mixed thoroughly. The $T_0$ optical density, which will be about 0.8, is immediately recorded. The mixture is then incubated at 37° C. and readings are taken every 10 to 15 minutes for 1 hour. The data are plotted as either optical density, or the change in optical density with time. Substrate controls rarely fall by more than 0.03 units.

EXAMPLE II

Utilization of a novel composition of the present invention

This example demonstrates the utilization of a novel composition of the present invention to effect the absorption of heparin. Furthermore, this example demonstrates the significant results obtained by employing the noval composition of the present invention to effect the absorption of heparin in the alimentary canal of a mammal.

The following compositions which are hereinafter set forth and are employed in the instant example, are prepared in the following manner:

*Composition A.*—Approximately 0.75 ml. of a 24% solution of heparin in water and 15 ml. of a 0.04 M aqueous solution of sodium taurocholate are dispersed with 2.25 ml. of trioctanoin producing an oil-in-water dispersion. The heparin content of this composition is 10 mg./ml.

*Composition B.*—Approximately 1.5 ml. of a 24% solution of heparin in water and 14.25 ml. of a 0.04 M solution of sodium taurocholate are dispersed with 2.25 ml. of trioctanoin producing an oil-in-water dispersion. The heparin content of this composition is 20 mg./ml.

*Composition C.*—Approximately 0.75 ml. of a 24% solution of heparin in water is mixed with 17.25 ml. of a 0.04 M aqueous solution of sodium taurocholate to produce an aqueous solution of heparin. The heparin content of the composition is 10 mg./ml.

*Composition D.*—Approximately 1.5 ml. of a 24% solution of heparin in water is mixed with 16.5 ml. of a 0.04 M aqueous solution of sodium taurocholate to produce an aqueous solution of heparin. The heparin content of this composition is 20 mg./ml.

*Compositions E and F.*—Dispersions are prepared as described for Compositions A and B with the exception that 0.04 M aqueous solution of sodium taurocholate is substituted for the heparin.

The above compositions are administered intraduodenally to test groups of rats and gerbils, Compositions A and B are administered respectively in a dose equivalent to 100 mg. of heparin per kilogram of body weight. Compositions C and D are also administered intraduodenally in a dose equivalent to 100 mg. per kilogram of body weight. Lastly, Compositions E and F are respectively administered intraduodenally to act as controls.

The results, set forth in the following table, are measured by performing both a clearing factor assay in the manner set forth in Example I, as well as a determination of antocoagulant activity which is determined by performing a capillary clotting time assay as hereinafter described.

TABLE 2

| Composition tested | Animal tested | Number of animals tested | Decrease in optical density at 650 mμ | | Anticoagulant activity | |
|---|---|---|---|---|---|---|
| | | | 15 minutes | 30 minutes | Animals tested | Clotting time, minutes |
| A | Rat | 7 | 0.43±0.05 | 0.56±0.06 | 5 | >45 |
| C | Rat | 15 | 0.03±0.00 | 0.04±0.00 | 4 | 3.8±0.5 |
| E | Rat | 3 | 0.02±0.02 | 0.01±0.01 | 3 | 3.0±0.2 |
| B | Gerbil | 6 | 0.53±0.03 | 0.58±0.02 | 6 | >45 |
| D | do | 6 | 0.04±0.01 | 0.04±0.02 | 6 | 5.2±1.1 |
| F | do | 6 | −0.03±0.00 | −0.04±0.01 | 6 | 5.3±0.4 |

The anticoagulant activity is determined by employing a capillary clotting time assay which is conducted in the following manner: Freshly drawn blood is collected by tail bleeding in a glass capillary tube having an inside diameter of 1 mm. The tube is tited every 30 seconds until the blood ceases to flow. At that time, a portion of the tube is broken off every 30 seconds until a fibrin thread is observed, which is determined as the end point.

EXAMPLE III

Utilization of a novel composition of the present invention

This example demonstrates the utilization of a novel composition of the present invention to effect the absorption of heparin. Furthermore, this example demonstrates the significant results obtained by employing the novel composition of the present invention to effect the absorption of heparin in the alimentary canal of a mammal.

The compositions, which are hereinafter set forth and are employed in the instant example, are prepared in the following manner:

*Composition A.*—Approximately 1.5 ml. of a 24% solution of heparin in water and 14.25 ml. of a 0.5 solution of polyoxyethylene sorbitan monolaurate are dispersed with 2.25 ml. of trioctanoin producing an oil-in-water dispersion. The heparin content of this composition is equal to 20 mg./ml.

*Composition B.*—Approximately 1.5 ml. of a 24% solution of heparin in water is mixed with 16.5 ml. of 0.5% solution of polyoxyethylene sorbitan monolaurate producing an aqueous solution of heparin. The heparin content of this composition is 20 mg./ml.

*Composition C.*—A dispersion is prepared in the manner described for Composition A with the exception that a 0.5% solution of polyoxyethylene sorbitan monolaurate is substituted in place of heparin for use as a control.

The above compositions are administered to rats intraduodenally in a dose equivalent to 100 mg. of heparin per kilogram of body weight. The control group is administered a proportionate dose of the control dispersion.

The results, set forth in the following table, are measured by performing both a clearing factor assay in the manner set forth in Example I, as well as a determination of anticoagulant activity which is determined by performing a capillary clotting time assay as set forth in Example II.

TABLE 3

| Composition tested: | Number of animals tested | Decrease in optical density at 650 mμ | | Anticoagulant activity | |
| | | 15 minutes | 30 minutes | Number of animals tested | Clotting time, minutes |
| --- | --- | --- | --- | --- | --- |
| A | 4 | 0.25±0.09 | 0.32±0.09 | 4 | 6.2±1.1 |
| B | 9 | 0.06±0.01 | 0.07±0.01 | 4 | 3.9±0.5 |
| C | 4 | 0.03±0.01 | 0.04±0.01 | | |

EXAMPLE IV

Utilization of a novel composition of the present invention

This example demonstrates the utilization of a novel composition of the present invention to effect the absorption of heparin. Furthermore, this example demonstrates the significant results obtained by employing the novel composition of the present invention to effect the absorption of heparin in the alimentary canal of a mammal.

The compositions, which are hereinafter set forth and are employed in the instant example, are prepared in the following manner:

*Composition A.*—Approximately 1.5 ml. of a 24% solution of heparin in water and 14.25 ml. of a 0.5% solution of an orthophosphate ester of a polyoxyethylated fatty alcohol sold as GAFAC R.E. 610 by General Aniline and Film, are dispersed with 2.25 ml. of trioctanoin porducing an oil-in-water dispersion. The heparin content of this composition is equal to 20 mg./ml.

*Composition B.*—Approximately 1.15 ml. of a 24% solution of heparin in water is mixed with 16.5 ml. of a 0.5% solution of an orthophosphate ester of a polyoxyethylated fatty alcohol sold as GAFAC R.E. 610 by General Aniline and Film producing an aqueous solution of heparin. The heparin content of this composition is equal to 20 mg./ml.

*Composition C.*—A dispersion is prepared in the manner described for Composition A with the exception that a 0.5% solution of an orthophosphate ester of a polyoxyethylated fatty alcohol sold as GAFAC R.E. 610 by General Aniline and Film is substituted in place of the heparin. This composition is employed as a control composition.

The above compositions are administered to rats intraduodenally in a dose equivalent to 100 mg. of heparin per kilogram of body weight. The control group is administered a proportionate dose of the control dispersion.

The results, set forth in the following table, are measured by performing both a clearing factor assay in the manner set forth in Example I, as well as a determination of anticoagulant activity which is determined by performing a capillary clotting time assay as set forth in Example II.

Although the invention has been described and illustrated by reference to particular embodiments thereof, it will be understood that in its broadest aspects the invention is not limited to such embodiments, and that variations and substitution of such equivalents may be resorted to within the scope of the appended claims.

What is claimed is:

1. A composition of matter as a W/O or an O/W dispersion consisting essentially of an effective intraduodenal dosage of from 0.5–30% heparin, having an activity of not less than 120 U.S.P. units per milligram, said composition having a heparin content of 10 or 20 mg./ml., about 5 to 30% of a metabolizable vegetable oil, about 60 to 90% water and about 0.01 to 5% of a nonionic, cationic, or anionic solid dispersing agent which (a) is capable of absorption by the alimentary canal of mammals, and (b) favors the formation of either W/O or O/W dispersions.

2. A composition according to claim 1, being further characterized such that a vehicle is present comprising a disperse phase and a continuous phase, said disperse phase and continuous phase being different from each other, and each is selected from the group consisting of a metabolizable oil and water.

3. A composition according to claim 2, in which the disperse phase is a metabolizable oil and the continuous phase is water.

4. A composition according to claim 2, in which the disperse phase is water and the continuous phase is a metabolizable oil.

5. A composition according to claim 2, in which the disperse phase comprises a water-in-metabolizable oil dispersion, and the continuous phase is water.

6. A composition according to claim 2, in which the disperse phase is trioctanoin, and the continuous phase is water.

7. A composition according to claim 2, in which the dispersing agent is sodium lauryl sulfate.

8. A method of effecting the absorption of heparin by the alimentary canal of a mammal which comprises introducing intraduodenally, in a dose equivalent to 100 mg. of heparin, having an activity of not less than 120 U.S.P. units, per kilogram of body weight, into said alimentary canal the composition of claim 1.

9. A method according to claim 8, in which the composition is further characterized such that a vehicle is present comprising a disperse phase and a continuous phase, said disperse phase and continuous phase being different from each other, and each is selected from the group consisting of a metabolizable oil and water.

10. A method according to claim 9, in which the dis-

TABLE 4

| Composition tested: | Number of animals tested | Decrease in optical density at 650 mμ | | Anticoagulant activity | |
| | | 15 minutes | 30 minutes | Number of animals tested | Clotting time, minutes |
| --- | --- | --- | --- | --- | --- |
| A | 4 | 0.34±0.01 | 0.46±0.13 | 4 | 11.4±4.4 |
| B | 6 | 0.04±0.00 | 0.04±0.00 | 4 | 3.4±0.1 |
| C | 6 | 0.04±0.00 | 0.04±0.00 | | | perse phase is trioctanoin and the continuous phase is water.

References Cited

UNITED STATES PATENTS

| | | | |
|---|---|---|---|
| 2,656,298 | 10/1953 | Loewe | 424—183 XV |
| 2,805,977 | 9/1957 | Robinson et al. | 424—19 |
| 2,875,130 | 2/1959 | Grass et al. | 424—19 |
| 3,146,167 | 8/1964 | Lantz et al. | 424—19 |
| 2,867,565 | 1/1959 | Feinstone | 424—229 |
| 3,062,716 | 11/1962 | Montandraud | 424—183 |
| 3,088,868 | 5/1963 | Windsor | 424—183 |
| 3,096,249 | 7/1963 | Prigal | 424—7 |
| 3,232,833 | 2/1966 | Riviere | 424—183 |
| 3,238,103 | 3/1966 | Vogenthaler | 424—230 |
| 3,247,063 | 4/1966 | Pulver | 424—183 |

FOREIGN PATENTS

| | | |
|---|---|---|
| 1,117,649 | 6/1968 | Great Britain. |
| 1,135,783 | 12/1968 | Great Britain. |
| 1,135,784 | 12/1968 | Great Britain. |

OTHER REFERENCES

Windsor et al., Am. J. Med. 37: 408–416 September 1964 "An Investigation of Routes of Administration of Heparin Other Than Injection."

SHEP K. ROSE, Primary Examiner